United States Patent [19]

Miller

[11] Patent Number: 4,705,446

[45] Date of Patent: Nov. 10, 1987

[54] HOISTING AND DUMPING CONTAINER

[76] Inventor: Richard J. Miller, 279 Esther St., Naples, Fla. 33942

[21] Appl. No.: 832,891

[22] Filed: Feb. 26, 1986

[51] Int. Cl.[4] .............................................. B65G 65/24

[52] U.S. Cl. .................................... 414/422; 220/1 T; 220/71; 294/68.26; 294/68.21; 294/67.31; 414/421; 414/403

[58] Field of Search ............... 414/403, 404, 414, 415, 414/418, 419, 420, 421, 422, 423, 424, 425; 220/1.5, 1 T, 212, 71, 72.1; 294/68.26, 68.1, 68.21, 68.3, 67.1, 67.31, 67.4, 67.41, 68.27

[56] References Cited

U.S. PATENT DOCUMENTS

| | | | |
|---|---|---|---|
| 752,187 | 2/1904 | Smith | 414/424 |
| 948,043 | 2/1910 | Ellis | 414/425 X |
| 3,881,617 | 5/1975 | Miller et al. | 414/422 |
| 4,095,708 | 6/1978 | Gerhard | 414/420 |

FOREIGN PATENT DOCUMENTS

| | | | |
|---|---|---|---|
| 685582 | 5/1964 | Canada | 414/421 |
| 2909532 | 9/1980 | Fed. Rep. of Germany | 414/422 |
| 1066650 | 4/1967 | United Kingdom | 414/422 |

*Primary Examiner*—Frank E. Werner
*Attorney, Agent, or Firm*—Brady, O'Boyle & Gates

[57] ABSTRACT

A container for hoisting materials at high rise construction sites and for lowering debris to ground level for dumping includes an open top box having a dumping end gate and being held on a raising and lowering frame by a pivot structure across the box and frame which is somewhat offset from the center of gravity of the box so that the box is gravity-assisted toward a tilted dumping position following release of a connection between the box and frame, which connection normally holds the box in a common plane with the frame. The frame is connectable to a hoisting and lowering device.

10 Claims, 6 Drawing Figures

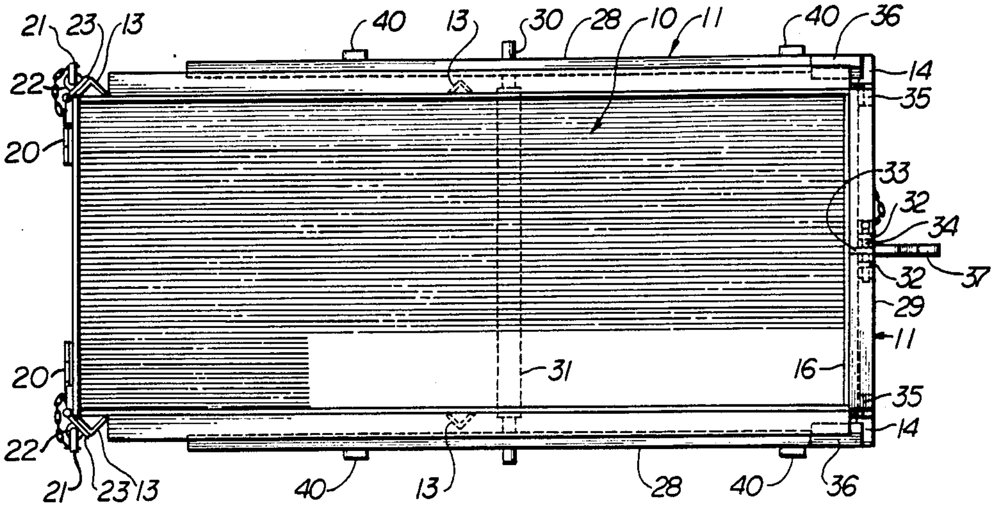
FIG 3
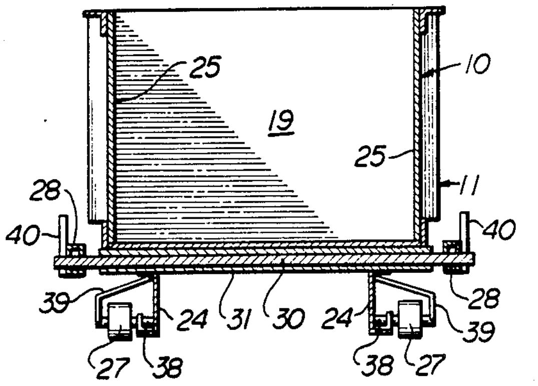
FIG 4
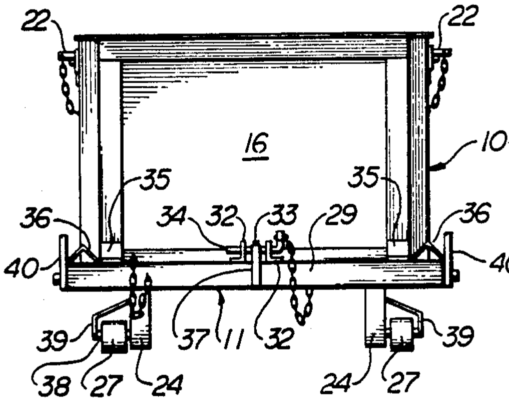
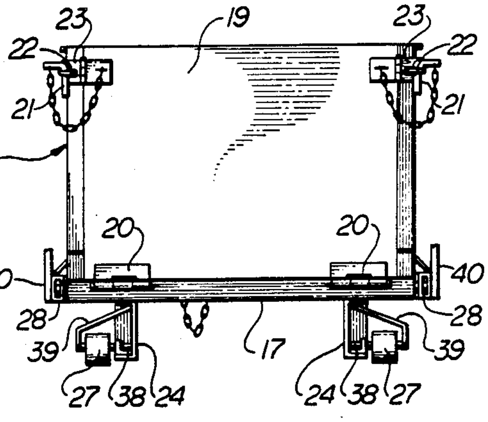
FIG 5 FIG 6

HOISTING AND DUMPING CONTAINER

BACKGROUND OF THE INVENTION

The present invention relates to a device for elevating materials used in the construction of high rise buildings from ground level, and for lowering materials and debris from any elevation on a building to ground level where the material is efficiently dumped into a truck or a large refuse box.

In spite of the fact that a variety of types of portable containers with dumping capability are known in the prior art, a strong unfulfilled need exists for a convenient, efficient and practical device for elevating materials from ground level to any elevation on a building undergoing construction and for lowering debris from any elevation to ground level for dumping. The present invention has for its principal object to completely satisfy this need.

More particularly, it is an object of the invention to provide a dumping container of the mentioned type which can be conveniently elevated and lowered by a construction crane or the like and which has the capacity of holding a substantial quantity of construction materials or debris, as the case may be.

Another object of the invention is to provide a dumping container having skids preferably equipped with wheels so that the container and its attached lifting frame can be moved efficiently on rough ground or on a smooth surface, such as the floor of a building.

Another object of the invention is to provide a hoisting and dumping container in which a container box is pivotally mounted on a hoisting and dumping frame which is adapted for ready connection and separation from a cable lifting harness of a crane or the like, and the dumping box is releasably coupled with the frame so that following the release of the coupling, the dumping box will tend to tilt by gravity to a dumping position on the frame.

Still another object of the invention is to provide a hoisting and dumping container which is strongly reinforced and therefore very durable, even in rough usage, and which is equipped at one end with a hinged dumping gate which in the lowered position forms a convenient ramp providing easy access into the container or a wheelbarrow or buggy.

Other important features and objects of the invention will become apparent to those skilled in the art during the course of the following description.

BRIEF DESCRIPTION OF THE DRAWINGS

FIG. 3 is a plan view of the container.

FIG. 4 is a transverse vertical section taken on line 4—4 of FIG. 2.

FIG. 5 is an end view of the container.

FIG. 6 is an opposite end view thereof.

DETAILED DESCRIPTION

Figure 1:
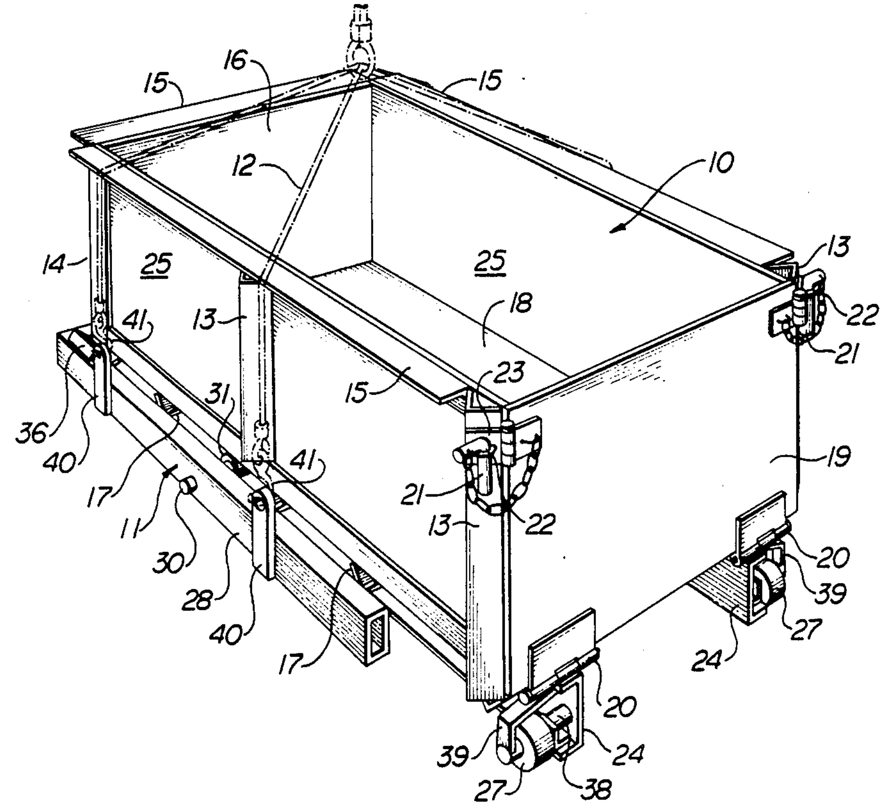
FIG. 1 is a perspective view of a hoisting and dumping container according to the present invention.

Referring to the drawings in detail wherein like numerals designate like parts, a hoisting and dumping container according to the present invention comprises a somewhat elongated open top rectangular box 10 fabricated from steel, a lifting and lowering frame 11 on which the box 10 is pivotally mounted, said frame being adapted for releasable connection with a hoisting means such as a cable harness 12 adapted to be operated by a construction crane.

The box 10 is sized to hold a substantial quantity of construction materials or debris requiring removal from upper levels of a building undergoing construction or renovation. The box 10 is heavily reinforced on its side walls by V-cross section vertical braces 13 attached by welding to the exteriors of the side walls and by angle braces 14 at corresponding ends of the box side walls. Similarly, external reinforcing flanges 15 for the box 10 are provided thereon at the tops of the two box side walls and on its fixed end wall 16. V-cross section cross braces 17 are similarly provided on the exterior face of the box bottom wall 18, as shown in the drawings. The interior faces of the box side, end and bottom walls are smooth and free of obstructions.

The box 10 is optionally provided with a dumping end gate or wall 19 which is hingedly connected at its bottom edge by a pair of sturdy hinges 20 to the bottom wall 18. The end gate 19 is secured releasably in the elevated vertical position by tethered easily removable vertical axis locking pins 21 which are received in keepers 22 on the braces 13 to retain hasps 23 carried by the end gate 19 to secure the end gate in an upright closed position.

During use, with the container resting on a level or near level surface, the end gate 19 can be dropped by removal of the locking pins 21 and then forms a convenient ramp so that wheelbarrows or buggies have easy access to the container. In some situations, the end gate 19 may not be needed or desired, in which case the pintles of hinges 20 can be removed and the end gate taken off of the box 10 leaving one end thereof open.

To render the box readily movable on the ground or on a smooth surface, such as the floor of a building, a pair of longitudinal skids 24, conveniently formed from channel sections, are fixedly attached to the bottom of the box 10 in parallel relationship, somewhat inwardly of the box longitudinal side walls 25 as best shown in FIG. 4. These skids extend for the full length of the box 10, and their forward ends are preferably rounded as at 26 for ease of movement on rough terrain.

On their outer sides, the skids 24 carry small wheels 27 at their rear ends adjacent to the end gate 19 and near and forwardly of their longitudinal centers. The wheels 27 project slightly below the skids 24 for engagement with a floor surface to support the container thereon. With this arrangement, the container may be moved easily on a building floor by two workmen.

The above-mentioned lifting and lowering frame 11 comprises a three-sided essentially U-shaped frame including parallel longitudinal frame bars 28 and a front transverse bar 29. The longitudinal frame bars 28 lie somewhat outwardly of the box side walls and the forward transverse frame bar 29 is similarly disposed slightly forwardly of the box end wall 16.

Figure 2:
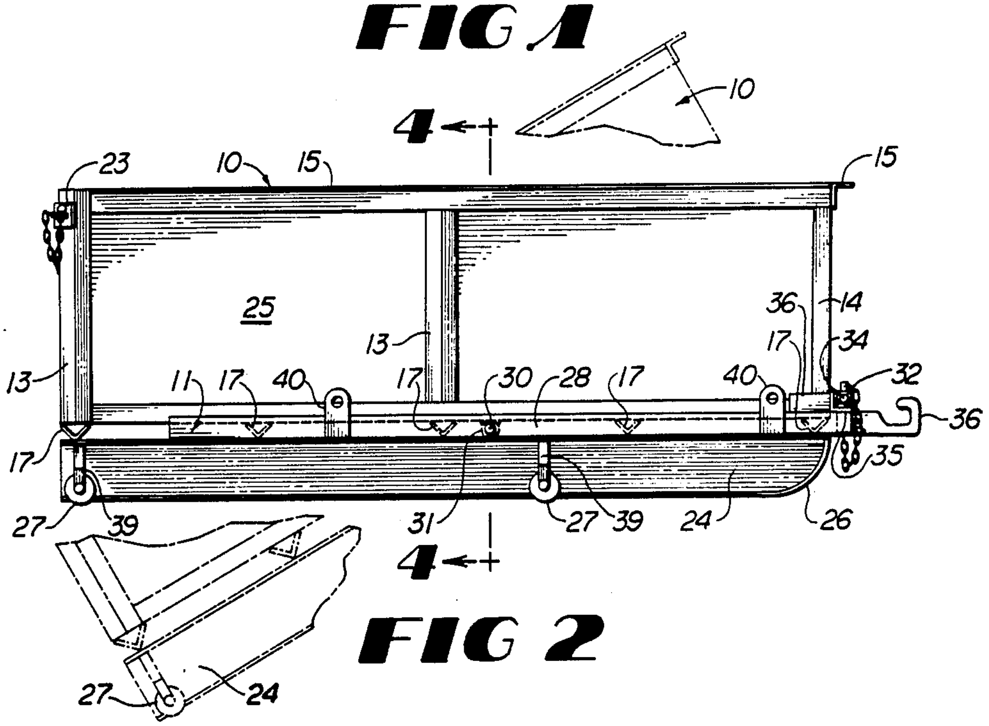
FIG. 2 is a side elevation of the container in a level mode showing the container body in a tilted dumping mode in broken lines.

The box 10 is pivotally connected with the lifting and lowering frame 11 by a transverse pivot shaft 30 held on the side frame bars 28, the shaft 30 extending through a sleeve 31 fixed as by welding to the bottom of the box 10, and being rotatable on the shaft 30. The transverse pivot axis of the box 10 defined by the elements 30 and 31 is somewhat forwardly of the longitudinal center of the box, and forwardly of its center of gravity. The pivot axis is slightly rearwardly of the forward pair of wheels 27, FIG. 2. With this arrangement, the box 10 is biased by gravity toward an inclined material dumping position on the frame 11 as indicated in phantom lines in FIG. 2.

A readily releasable connection between the front frame bar 29 and box 10 includes interfitting apertured lugs 32 and 33 fixed to the top of the frame bar 29 and the front of the box, respectively. When the box 10 is positioned in parallel relationship to the frame 11, the apertured lugs 32 and 33 are in alignment and an easily releasable tethered locking pin 34 is placed through the apertures of the three lugs 32 and 33 and serves to lock the box 10 securely to the frame 11. The locking pin 34 is pulled to free the box 10 for pivoting on the frame 11 when dumping is required. It should be noted that the skids 24 being attached to the box 10 pivot with the box inside of the lifting and lowering frame 11 on the axis of pivot shaft 30.

A pair of fixed stop elements 35 are secured to the box 10 adjacent to its front lower corners, and these stop elements solidly engage the top of transverse frame bar 29 when the apertures of the lugs 32 and 33 are in registration to receive the locking pin 34. By virtue of this arrangement, the forward end of the box 10 can never swing below a position of parallelism with the frame 11, whereas the opposite dumping end of the box 10 is free to swing downwardly to dump the box contents whenever the pin 34 is pulled.

To assure proper centering of the box 10 relative to the frame 11 when the box swings toward its locked position on the frame, a pair of inclined box centering elements 36 is fixedly secured to the top of the frame 11 near its front corners.

To assist in moving or towing the dumping container on rough ground where only the skids 24 are active, a draft tongue 37 is fixed to the front transverse frame bar 29 at its center and below the interfitting locking lugs 32 and 33.

As explained previously, the wheels 27 become active when the container is resting on a smooth surface, such as a building floor. Preferably, as shown in the drawings, the wheels 27 are outboard of the skids 24 and are held on axles 38 connected with the skids. Braces 39 interconnect the outer ends of the axles 38 with the skids, as shown. Other wheel mounting arrangements can be employed, if desired.

Pairs of apertured vertical frame lifting plates 40 are fixed to the outer faces of the side frame bars 28. One pair of the plates 40 is located near but somewhat rearwardly of the front frame bar 29 while the other pair of plates 40 is located near and forwardly of the rear ends of the side frame bars and rearwardly of the pivot axis of the box 10.

As shown in FIG. 1, attaching hooks 41 of the cable lifting harness 12 operated by a crane or the like are releasably engaged with the apertures of the plates 40. When the container is being raised and lowered, the locking pin 34 is always in place so that the box 10 and frame 11 are in parallel relationship.

The contents of the box 10 can be easily dumped into a truck or into a large refuse box on the ground. The dumping container according to the invention is designed to be transported by conventional refuse box trucks or by any flatbed truck or trailer. The dumping container according to the invention upon lowering to the ground can be dragged by a towing vehicle coupled to the tongue 36 to any appropriate emptying site. As stated previously, the invention can be operated with or without a dumping end gate 19.

In view of the foregoing description, it is believed that the operation or use of the container should be quite clear to anyone skilled in the art.

It is to be noted that the skids 24 are fixedly attached to the bottom of box 10 by means of welding to the bottom sides of the V-cross section cross braces 17 and the sleeve 31. The tops of the skids are thus spaced from the bottom 18 of the box by the cross braces 17 and sleeve 31.

The terms and expressions which have been employed herein are used as terms of description and not of limitation, and there is no intention, in the use of such terms and expressions, of excluding any equivalents of the features shown and described or portions thereof but it is recotnized that various modifications are possible within the scope of the invention claimed.

I claim:

1. A hoisting and dumping container comprising a container lifting frame adapted for connection releasable with a hoisting and lowering device, said frame including three-sided frame including a pair of side frame bars and one end bar, a box adapted to hold a substantial amount of material requiring elevating and/or lowering or dumping, a fixed transverse pivot shaft extending between said pair of side frame bars, a transversely extending sleeve fixed to the bottom of said box, said sleeve being freely rotatable on said shaft, said pivot shaft nad sleev defining a pivot axis forwardly of the longitudinal center of the box and forwardly of its center of gravity, whereby the box is biased by gravity toward a tilted material dumping position relative to the frame, readily releasable connecting means on the box and frame for locking the box and frame in substantially parallel relationship, cooperative stop means on the box and frame engageable when the box and frame are in parallel relationship and arresting swinging movement of the box relative to the frame in one direction beyond said parallel relationship but allowing the box to swing freely relative to the frame in an opposite direction on its pivot axis to a dumping position, skid means secured to the bottom of the box and pivoting with the box relative to said frame when the box swings to or from a tilted dumping position relative to said frame, and wheel menas attached to the skid means and projecting somewhat below bottom faces of the skid means, said frame being substantially in a plane between the bottom of the box and thee top of the skids.

2. A hoisting and dumping container as defined in claim 1, and the box comprising an open top rectangular box having a normally open material dumping end more distant from the pivot axis of the box than the opposite end of the box, and the readily releasable connecting means being located on said one end bar of the frame and said opposite end of the box.

3. A hoisting and dumping container as defined in claim 2, and the readily releasable connecting means comprising interfitting connecting elements on said one end bar of the frame and said opposite end of the box, and an easily releasable locking element engageable with the interfitting connecting elements.

4. A hoisting and dumping container as defined in claim 3, and the interfitting connecting elements comprising apertured lugs, and the easily releasable locking element comprising a locking pin.

5. A hoisting and dumping container as defined in claim 4, and a draft tongue for the container secured to said one end bar of the frame.

6. A hoisting and dumping container as defined in claim 1, and said box being equipped at its end most distant from the pivot axis of the box with a hinged end gate, and releasable means to secure the end gate in an upright non-dumping position on the box.

7. A hoisting and dumping container as defined in claim 6, and said end gate being hinged to the bottom wall of the box to provide an entrance ramp leading into the box when the end gate is lowered.

8. A hoisting and dumping container as defined in claim 1, and reinforcing members on the exteriors of the box side walls and bottom wall, and the interiors of the box walls being smooth and unobstructed.

9. A hoisting and dumping container as defined in claim 1, and box centering means on said frame near its end least distant from the pivot axis of the box and coacting with said stop means to provide precision alignment of the readily releasable connecting means.

10. A hoisting and dumping container as defined in claim 1, and apertured lifting cable engaging elements fixed to opposite sides of the lifting frame, and said opposite sides of the lifting frame being disposed somewhat outwardly of the adjacent box side walls.

* * * * *